United States Patent [19]

Larson et al.

[11] Patent Number: 4,862,307

[45] Date of Patent: Aug. 29, 1989

[54] DUAL VOLTAGE DISTRIBUTION TRANSFORMER WITH INTERNAL VARISTOR SURGE PROTECTION

[75] Inventors: Carl A. Larson; Charles J. McMillen, both of Hickory; Edgar E. McQuay, Conover, all of N.C.

[73] Assignee: General Electric Company, King of Prussia, Pa.

[21] Appl. No.: 215,525

[22] Filed: Jul. 6, 1988

[51] Int. Cl.[4] .............................................. H02H 7/04
[52] U.S. Cl. ........................................ 361/38; 361/40; 361/111; 361/118
[58] Field of Search ....................... 361/35, 38, 39, 40, 361/111, 118; 336/70; 323/346

[56] References Cited

U.S. PATENT DOCUMENTS

| | | | |
|---|---|---|---|
| 3,211,956 | 10/1965 | Dornbush | 361/40 |
| 3,440,586 | 4/1969 | Goodman et al. | 323/346 |
| 3,855,521 | 12/1974 | Kiuchi | 323/346 |
| 4,604,673 | 8/1986 | Schoedube | 361/38 |
| 4,621,298 | 11/1986 | McMillen | 361/38 |

Primary Examiner—A. D. Pellinen
Assistant Examiner—Jeffrey A. Gaffin
Attorney, Agent, or Firm—Henry J. Policinski; William Freedman

[57] ABSTRACT

This dual voltage transformer comprises a primary winding having a tap at a location intermediate its length, a first termination for connection to line voltage, and a second termination for connection to ground. When the transformer is to be operated at a relatively high voltage, the first termination is connected through a dual voltage switch to line voltage; and when the transformer is to be operated at a relatively low voltage, the tap is connected through said switch to line voltage. First varistor means is connected across the primary winding between said first and second terminations both when the transformer is operated at high voltage and at low voltage; and second varistor means having a lower breakover voltage than the first varistor means is connected between said tap and ground when the transformer is operated at low voltage.

14 Claims, 4 Drawing Sheets

DUAL VOLTAGE DISTRIBUTION TRANSFORMER WITH INTERNAL VARISTOR SURGE PROTECTION

BACKGROUND OF THE INVENTION

This invention relates to electric transformers of the dual voltage type, and more particularly, to voltage surge or impulse protection for dual voltage distribution transformers.

Dual voltage distribution transformers are generally understood in the art as being those distribution transformers having two primary voltage ratings, typically a higher voltage rating and a lower voltage rating. One way of achieving this dual voltage rating is to provide the transformer with a plurality of primary windings which are connected in series to effect the higher voltage rating or are connected in parallel to effect the lower voltage rating. Conversion from one voltage rating to the other is effected by operating a special switch, commonly referred to as a dual-voltage switch. In a first condition, this switch connects the windings in series, and in a second condition, the switch connects the windings in parallel. A dual voltage transformer that employs this approach is illustrated in U.S. Pat. 4,621,298—McMillen, assigned to the assignee of the present invention.

The above approach to providing a dual voltage rating is satisfactory if the dual voltage ratio (i.e., the ratio of the higher voltage rating to the lower voltage rating) is less than about 4 to 1. But if this ratio appreciably exceeds this value, it becomes necessary with this approach to employ an awkward, bulky, and complex design for he dual voltage switch and the associated wiring that connects the switch with the windings. Generally speaking, the greater this ratio, with the above-described approach, the more bulky and complex becomes the design of the dual voltage switch and the associated wiring.

We use, for providing dual-voltage rating capability, an approach different from the above that allows the dual voltage switch and the associated wiring to be of a less bulky and complex design, especially when the dual voltage ratio is greater than 4 to 1.

The approach that we use involves providing the primary winding with a tap at a location intermediate its length that is kept idle when the transformer is being used at its higher voltage rating. The primary winding has a first termination at one end for connection to line voltage when the transformer is being used at its higher voltage rating and a second terminal at its opposite end for connection to ground. When the transformer is to be operated at its lower voltage rating, line voltage is connected to the tap and is disconnected from said first termination except through a then-idle portion of the primary winding that extends between the tap and the first termination.

The above-described tap may be located at any desired point along the length of the primary winding to provide the desired dual-voltage ratio. This is advantageous in terms of flexibility and simplicity; but a problem with this approach is that when the transformer is connected for its lower voltage rating, the then-idle portion of the primary winding is vulnerable to damage from surge voltages. The primary winding then has an autotransformer configuration, and an incoming surge appearing across the active portion of the primary winding will be transformed by autotransformer action to a much higher voltage surge across the then-idle portion of the winding between the tap and the first termination. In general, the higher the dual voltage ratio, the higher will be the peak to which this higher voltage surge tends to rise.

OBJECTS

An object of our invention is to provide, for this tapped-primary dual-voltage type of transformer, effective surge protection means for protecting the relatively vulnerable idle portion, or portions, of the primary winding when the transformer is connected for its lower voltage rating.

Another object is to achieve the immediately-preceding object in a dual voltage transformer having a dual voltage ratio greater than 4 to 1.

Another object is to achieve the two immediately-preceding objects using simple varistor means located inside the transformer tank and also capable of providing effective surge protection when the transformer is connected for its higher voltage rating.

Still another object is to provide, for the tapped-primary dual-voltage type of transformer, full surge protection while the transformer is connected in either its higher or lower voltage rating configurations and to achieve this full protection without requiring a dual voltage switch that is unduly bulky and complex.

SUMMARY

In carrying out our invention in one form, we provide a dual voltage transformer that comprises a tank and a primary winding within the tank having (i) a first termination for connection to line voltage when the transformer is to be operated at a relatively high voltage applied between the first termination and ground and (ii) a second termination for connection to ground. At a location intermediate the length of this winding is a tap connection to line voltage when the transformer is to be operated at a relatively low voltage, applied between said tap and ground. The transformer further comprises a dual voltage switch operable in a first condition to connect said first termination to line voltage while said tap is idle and operable in a second condition to connect said tap to line voltage and to disconnect said first termination from line voltage except through a then-idle portion of said primary winding extending between said tap and said first termination. Also disposed within the tank are (1) first varistor means having opposed first and second electrode ends, (2) means for electrically connecting said first electrode end to said first termination and for electrically connecting said second electrode end to said second termination, (3) second varistor means having a lower breakover voltage than said first varistor means and having opposed electrode ends, and (4) means operable when the tap is connected to line voltage for electrically connecting one of the electrode ends of said second varistor means to said tap and the other electrode and of said second varistor means to ground.

BRIEF DESCRIPTION OF THE DRAWINGS

For a better understanding of the invention, reference may be had to the following description taken in conjunction with the accompanying drawings, wherein.

DETAILED DESCRIPTION OF PREFERRED EMBODIMENTS

Figure 1:
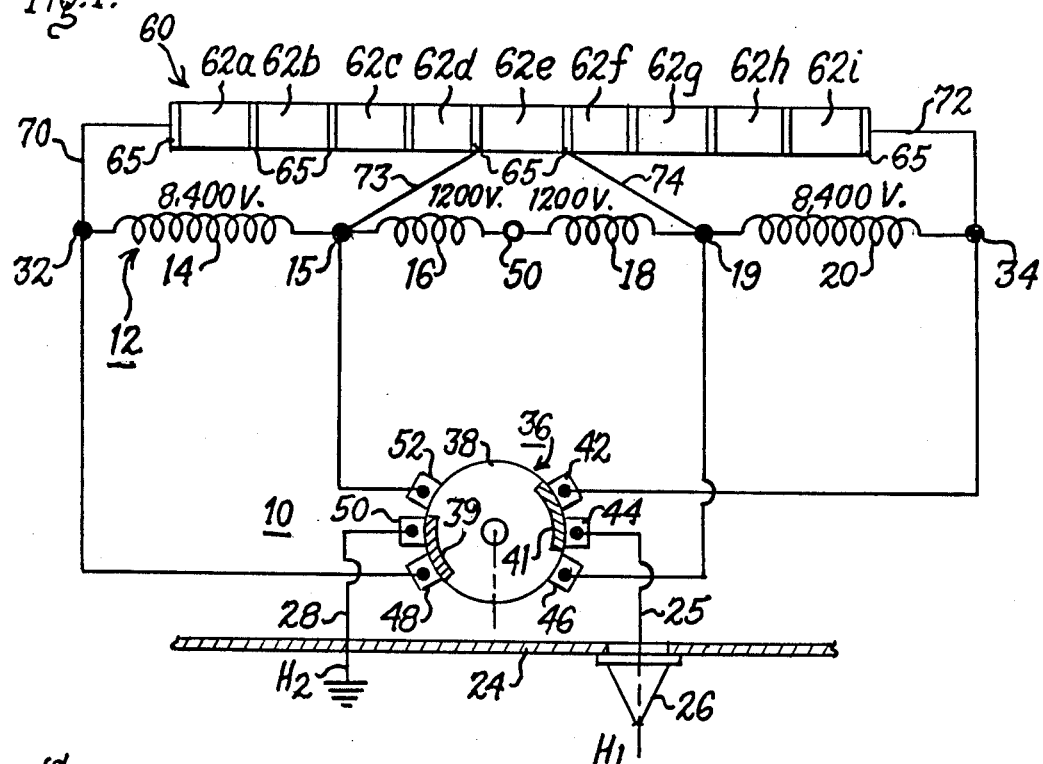
FIG. 1 is a circuit diagram of a dual voltage distribution transformer having a primary winding connected for its higher voltage rating and surge-protected in accordance with one form of our invention.

Referring first to FIG. 1, there is shown a schematic diagram of the primary circuit of a dual voltage distribution transformer generally indicated at 10. This primary circuit includes a primary winding 12 divided into four sections 14, 16, 18 and 20. At electrically-spaced locations intermediate the length of the primary winding 12 are two taps 15 and 19. One of these taps 15 is located electrically between winding sections 14 and 16, and the other tap 19 is located electrically between winding sections 18 and 20. For the sake of clarity and simplicity, other parts of the transformer, such as the secondary winding circuit, core, etc., have been omitted from the drawings. A portion of the transformer tank is shown at 24, and the incoming lead 25 from the high voltage line terminal $H_1$ is shown entering the tank 24 through an insulating bushing 26. The opposite end of the primary circuit is indicated at $H_2$ and comprises an outgoing lead 28 connected to the tank 24 and ground.

The primary winding 12 comprises terminations 32 and 34 at its respective opposite ends. These terminations are respectively connected to the transformer's incoming and outgoing leads 25 and 28 through a dual voltage switch schematically shown at 36. The schematically-illustrated dual voltage switch comprises a rotatable cylindrical insulating drum 38 that carries two spaced-apart conductive segments 39 and 41, each extending over a portion of the periphery of the drum. These are six stationary contacts 42, 44, 46, 48, 50 and 52 angularly spaced apart about the periphery of drum 38. When the drum 38 is in its position of FIG. 1, conductive segment 41 conductively interconnects switch contacts 42 and 44; conductive segment 39 conductively interconnects switch contacts 48 and 50; and switch contacts 46 and 52 are electrically isolated from each other and from the other switch contacts.

It will be apparent from the description of the immediately-preceding paragraph that when the dual voltage switch 36 is in its position of FIG. 1, the incoming line 25 is connected through the switch 36 to the termination 34 of the primary winding 12, and the outgoing line 28 is connected through the switch 36 to the opposite termination 32 of the primary winding. Thus, in FIG. 1, the four sections 14, 16, 18 and 20 of the primary winding are connected in series and the taps 15 and 19 are essentially idle. When the four primary winding sections are so connected, the dual voltage transformer is configured for its higher voltage rating.

Figure 2:
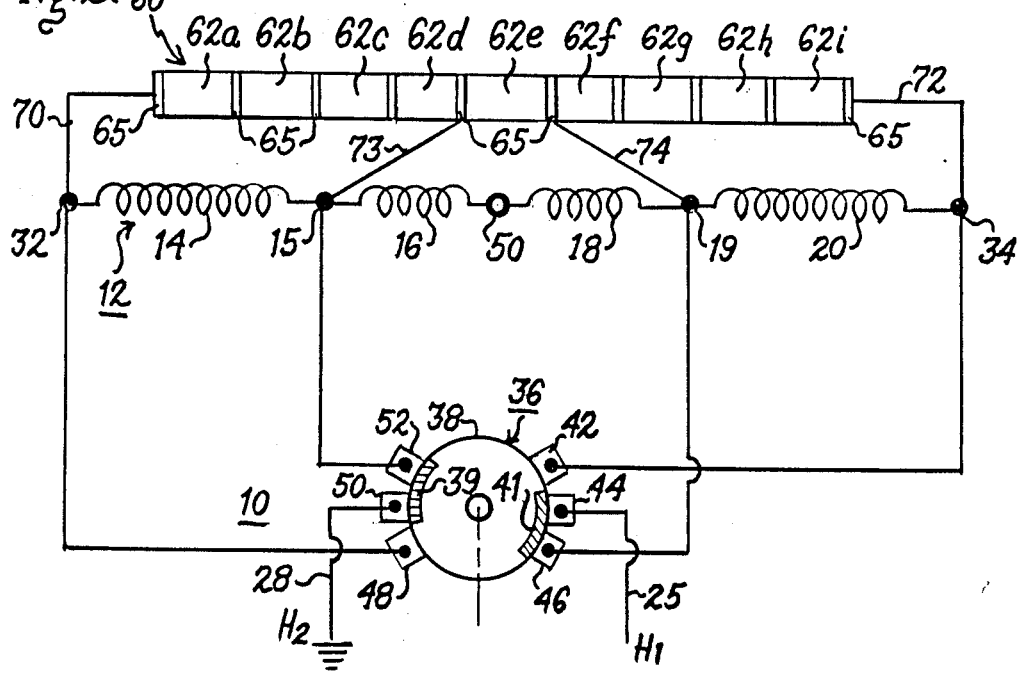
FIG. 2 is a circuit diagram of the dual voltage transformer of FIG. 1 having its primary winding connected for its lower voltage rating and surge-protected in accordance with the form of our invention shown in FIG. 1.

The transformer is converted from its higher voltage rating depicted in FIG. 1 to its lower voltage rating depicted in FIG. 2 by connecting the incoming and outgoing lines 25 and 28 to the taps 15 and 19, respectively, thus rendering the outer winding sections 14 and 20 essentially idle. The termination 34 is then effectively disconnected from line voltage except through the then-idle winding section 20; and the termination 32 is then effectively disconnected from ground except through the then-idle winding section 14.

For effecting this conversion of the transformer into a lower voltage rating device, the dual voltage switch is operated to rotate the drum 38 in a clockwise direction from its position to FIG. 1 into its position of FIG. 2. This results in the switch contacts 44 and 46 being conductively interconnected, the switch contacts 50 and 52 being conductively interconnected, and the switch contacts 42 and 48 being electrically isolated from the other switch contacts, all as shown in FIG. 2. Accordingly, in FIG. 2, the incoming line 25 is connected to tap 19 through switch contacts 44 and 46, and the outgoing line 28 is connected to tap 15 through switch contacts 50 and 52, and the outer winding sections 14 and 20 are essentially idle.

In one specific embodiment of the invention, the transformer of FIGS. 1 and 2 has a line-to-ground primary voltage rating of 19,200/2,400 volts. This means that when the transformer is configured for its higher voltage rating, it is capable of operating according to specification with a line-to-ground r.m.s. voltage of 19,200 volts across its terminals $H_1$ and $H_2$; and when configured for its lower voltage rating it is capable of so operating with 2,400 volts across its terminals $H_1$ and $H_2$. A transformer with this rating is considered to have a dual voltage ratio of 19,200/2,400, or 8 to 1. For achieving this dual voltage rating and ratio in the FIGS. 1 and 2 embodiment, we divide the primary winding 12 into two separate series-connected portions 14, 16 and 18, 20, each rated at 9,600 volts and respectively located on the two legs of the core of a core-type transformer on opposite sides of an electrical midpoint 50 of the composite winding 12. The tap is in winding portion 14, 16 is located to divide this winding portion into a section 14 rated at 8,400 volts and a section 16 rated at 1,200 volts. The tap 19 in winding portion 18, 20 is located to divide this winding portion into a section 20 rated at 8,400 volts and a section 18 rated at 1,200 volts.

It will thus be seen that when the dual voltage switch 36 is in its position of FIG. 1, with all the winding sections connected in series between terminals $H_1$ and $H_2$, the rating of the transformer is the sum of all the ratings of the four winding sections, or 19,200 volts. When the dual voltage switch 36 is in its FIG. 2 position, only the two inner winding sections 16 and 18, rated at 1,200 volts each, are connected between transformer terminals $H_1$ and $H_2$, and thus the transformer rating in this configuration is 1,200+1,200, or 2,400 volts.

It will be apparent from the above paragraph that by proper selection of the location of the taps 15 and 19, the dual voltage ratio of the transformer can be chosen at any desired value.

As noted hereinabove under BACKGROUND, there is a surge-voltage protection problem that arises when the above-described tapped-primary approach is used for achieving the dual voltage rating. More specifically, when the transformer is configured, as illustrated in FIG. 2, for its lower voltage rating, the then-idle winding sections (14 and 20) tend to be vulnerable to damage from surge voltages. When connected as in FIG. 2, the transformer has an autotransformer configuration; and, as a result, an incoming voltage surge appearing across the then-active portion 16, 18 of the primary winding will be transformed by autotransformer action to a much higher voltage surge across the then-idle sections 14 and 20 of the winding. (The extent of this transformation is the ratio of the voltage rating of the then-idle winding sections 14, 20 to that of the active winding sections 16, 18, or 16,800/2,400, or 7 to 1.) As above noted, an object of our invention is to effectively protect the then-idle sections of the primary winding against these high-voltage surges and to do this with simple varistor means capable of providing full surge protection for the winding sections whether connected in their higher or lower voltage configurations.

For achieving this surge voltage protection, we provide a surge arrester that comprises a stack 60 of metal oxide varistor elements 62, respectively designated 62a through 62i. These metal-oxide varistor elements are identical and of a conventional design; and, as such, each comprises a metal-oxide varistor disc having conductive coatings thereto at its opposite ends. At the ends of the stack and between adjacent varistor elements are conductive discs 65. The entire assembly is located in a cylindrical insulating housing (not shown) containing a compression spring (also not shown) which forces the components together, electrically in series, and assures good electrical contact between adjacent components. The outer conductive discs 65 may be thought of as electrode ends for the varistor stack.

The entire varistor stack 60 is electrically connected across the series combination of winding sections 14, 16, 18 and 20 by means of conductive leads 70 and 72 respectively extending between the electrode ends of the stack and the terminations 32 and 34 of the primary winding. In the embodiment of FIGS. 1 and 2, the series combination of the two inner windings 16 and 18 is connected across one of the varistor elements 62e by conductive leads 73 and 74 respectively extending between the taps 15, 19 and the conductive discs 65 forming the electrode ends for varistor element 62e. The leads 70, 72, 73 and 74 remain connected as shown in FIG. 1 whether the transformer is in its higher voltage configuration of FIG. 1 or its lower voltage configuration of FIG. 2.

Surge arrester 60 is located inside the metal tank 24 of the transformer and under the insulating oil contained therein. Locating the arrester internally of the transformer tank, rather than externally, materially simplifies the transformer by eliminating the need to bring the arrester leads 73 and 74 through the tank walls via separate insulating bushings, which would need to be provided therefor.

Figure 3:
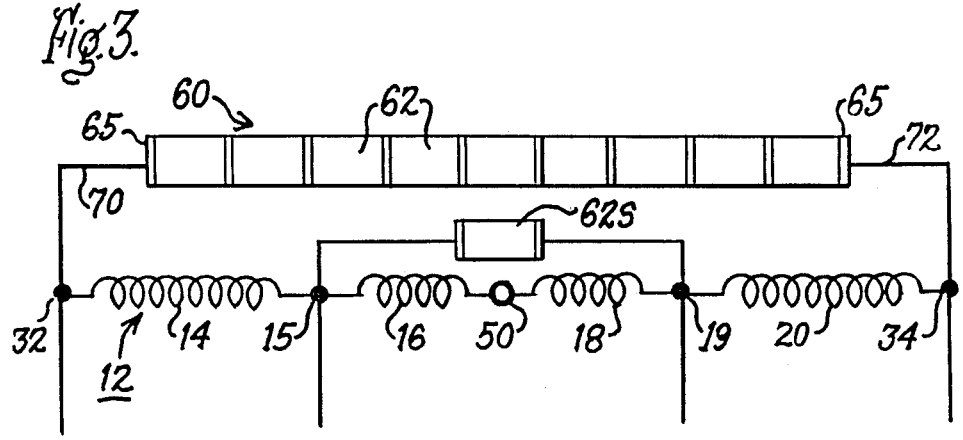
FIG. 3 is a circuit diagram of a transformer corresponding to that of FIGS. 1 and 2 except including a modified form of surge protection.

Although FIGS. 1 and 2 and 3 show conductive discs 65 at both ends of each varistor element 62, in a commercial form of the invention, we omit these discs at those locations where there are no leads, thus allowing direct contact between the coated faces of the varistor elements at these locations.

In the embodiment of FIGS. 1 and 2, each of the varistor elements 62 is rated at 3 KV breakover voltage, thus giving the entire 9-element stack a rating of 27 KV breakover voltage. Since the 27 KV varistor stack is connected across the entire primary winding 12, the surge voltage impressed across the primary winding cannot rise appreciably higher than 27 KV without causing the arrester to breakover. This effectively protects the primary winding against damage from any surge voltages appearing across terminations 32 and 34 that would otherwise rise to higher values, and provides such protection whether the transformer is configured for its higher voltage rating of FIG. 1 or its lower voltage rating of FIG. 2.

When the transformer is configured as in FIG. 2, the active winding portion 16, 18 (rated at 2,400 volts) is protected by the 3 KV-rated varistor element 62e connected there-across against surge voltages that might otherwise rise to a higher level than 3 KV. The above-described autotransformer action that is present when the transformer is configured as in FIG. 2 cannot develop (in response to maximum severity surges across winding portion 16, 18 of FIG. 2) a surge voltage across either of the then-idle winding sections 14 or 20 substantially higher than the 12 KV breakover voltage rating of the portions of the varistor stack 60 connected across them, and this effectively protects these idle winding sections 14 and 20 under these circumstances.

It is to be noted that the above-described surge protection provided for the winding sections of the transformer has been introduced without adding complexity or bulk to the dual voltage switch 36 or the wiring that connects the switch to the winding sections. This, of course, is a significant advantage.

FIG. 3 shows a modified dual voltage transformer that corresponds to the transformer of FIGS. 1 and 2 in all substantial respects except that a separate varistor element (62s) is connected across the winding portion 16, 18. Instead of relying for protection of this winding portion upon an element of the varistor stack 60, as in FIG. 1, this modification relies upon a separate varistor element.

In the embodiment of FIG. 3, when the transformer is connected in its lower voltage configuration and the outer transformer winding sections 14 and 20 are idle, they are protected by the entire 27 KV varistor stack across the entire primary winding, and this provides adequate surge protection for the then-idle winding sections 14 and 20.

Figure 4:
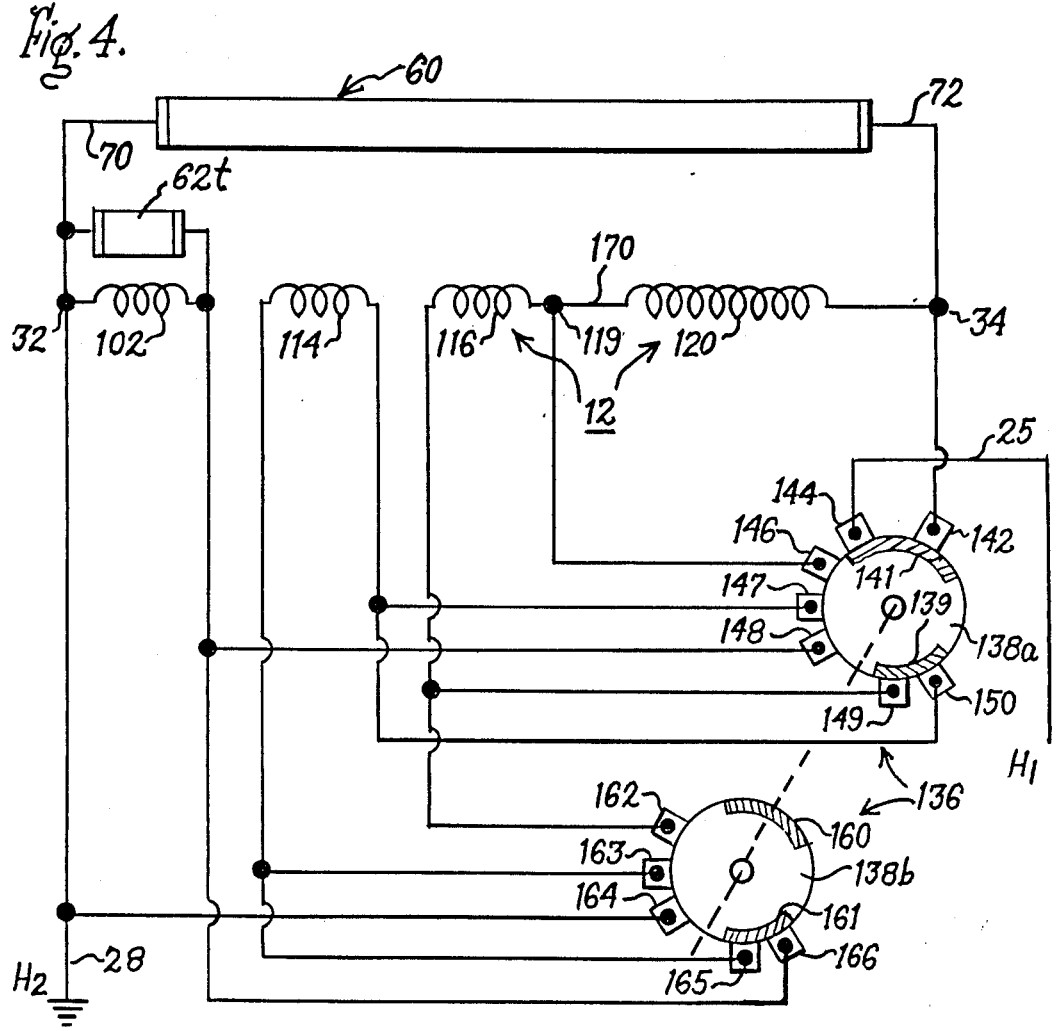
FIG. 4 is a circuit diagram of a modified form of dual voltage transformer having its primary winding connected for its higher voltage rating and surge-protected in accordance with another form of our invention.
Figure 5:
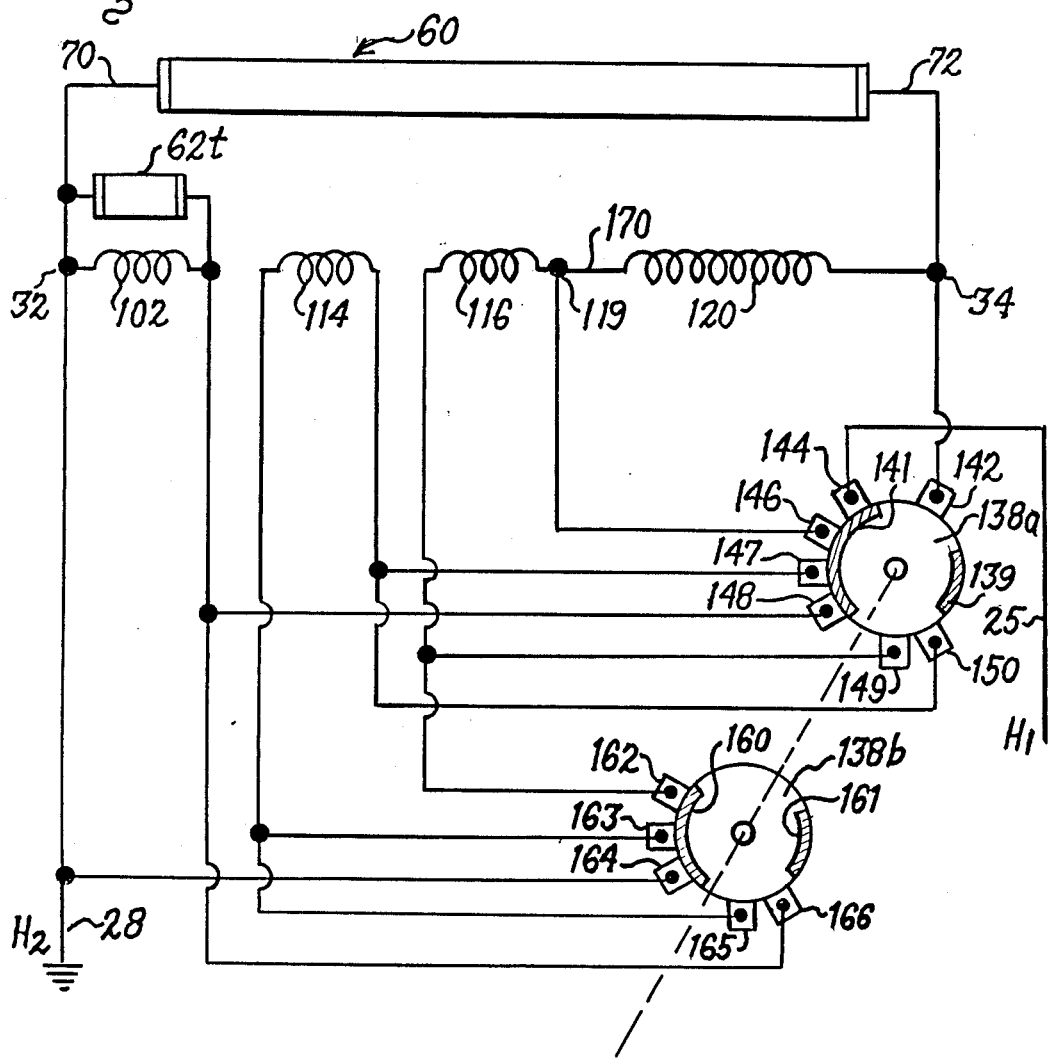
FIG. 5 is a circuit diagram of the dual voltage transformer of FIG. 4 having its primary winding connected for its lower voltage rating and surge-protected in accordance with the form of the invention shown in FIG. 4.

FIGS. 4 and 5 show another modified form of the invention. In this form, the primary winding is divided into four sections 102, 114, 116 and 120, with a tap 119 at a point intermediate the length of the winding in a location between winding sections 116 and 120. When the transformer is in its higher rated voltage configuration of FIG. 4, all four of these winding sections are connected in series. When the transformer is in its lower rated voltage configuration of FIG. 5, the winding sections 102, 114 and 116 are connected in parallel, and the winding section 120 is then idle.

In a specific embodiment of FIGS. 4 and 5, the winding sections 102, 114 and 116 are rated at 2,400 volts each, and the winding section 120 is rated at 12,000 volts. This provides a voltage rating of 3(2,400)+12,000, or 19,200, volts for the transformer when connected in its higher voltage configuration of FIG. 4 and a voltage rating of 2,400 volts when the transformer is connected in its lower voltage configuration of FIG. 5. The dual voltage ratio of this transformer is 19,200/2,400, or 8 to 1.

The dual voltage switch (136) for the embodiment of FIGS. 4 and 5 comprises two rotatable insulating drums 138a and 138b that are mechanically coupled together for rotation in unison. Drum 138a carries two spaced-apart conductive segments 141 and 139, each extending over a portion of the periphery of the drum. At angularly-spaced points about the periphery of drum 138a are seven stationary switch contacts 142, 144, 146, 147, 148, 149 and 150. When the drum 138a is in its position of FIG. 4, conductive segment 141 electrically interconnects contacts 142 and 144; conductive segment 139 electrically interconnects contacts 149 and 150; and the remaining switch contacts 146, 147 and 148 are electrically isolated from the other switch contacts and from each other.

The other insulating drum 138b carries two angularly-spaced conductive segments 160 and 161, each extending over a portion of the periphery of the drum. At angularly-spaced points about the periphery of this drum 138b are five stationary switch contacts 162, 163, 164, 165 and 166. When the drum 138b is in its position of FIG. 4, conductive segment 161 electrically interconnects contacts 165 and 166, but switch contacts 162, 163 and 164 are electrically isolated from each other and the other switch contacts 165 and 166.

It will be apparent from the description of the two immediately-preceding paragraphs that when the dual voltage switch 136 is in its position of FIG. 4, the incoming line 25 is connected through the switch 136 to the termination 34 of the primary winding 12, the outgoing line 28 is connected to the opposite termination 32 of the primary winding, and the four winding sections 102, 114, 116 and 120 are electrically connected in series with each other between terminations 32 and 34. More specifically, winding section 102 is connected with winding section 114 through switch contacts 165 and 166; winding section 114 is connected to winding section 116 through switch contacts 149 and 150; and the series combination of sections 102, 114 and 116 is connected in series with winding section 120 through conductor 170.

The transformer is converted from its higher voltage rating of FIG. 4 to its lower voltage rating depicted in FIG. 5 by connecting the incoming line 25 to the tap 119, thus rendering winding section 120 essentially idle. The termination 34 of composite winding 12 is then effectively disconnected from line voltage except through the then-idle winding section 120.

For effecting this conversion of the transformer to its lower voltage rating, the dual voltage switch 136 is operated to rotate the drums 138a and 138b in a counter-clockwise direction from their positions of FIG. 4 into their positions of FIG. 5. This results in the switch contacts 144, 146, 147 and 148 being electrically interconnected through segment 141; the switch contacts 162, 163 and 164 being electrically interconnected through segment 160; and the switch contacts 142, 149 and 150 being electrically isolated from each other and from all the other switch contacts, and the switch contacts 165 and 166 being electrically isolated from each other and all the other switch contacts.

It will be apparent from the immediately-preceding paragraph that when the winding sections are connected as depicted in FIG. 5, the three windings 102, 114 and 116 are connected in parallel between tap 119 and termination 32, and the winding section 120 is idle. Tap 119 is, in effect, connected to the right-hand terminal of each of the windings 102, 114 and 116 through the switch contacts 146, 147 and 148; and termination 32 is connected to the left-hand terminal of each of the windings 102, 114 and 116 through switch contacts 162, 163 and 164.

For protecting the winding sections of FIGS. 4 and 5 against surge voltages, a varistor stack 60, rated at 27 KV and substantially identical to the other varistor stacks 60 described hereinabove, is provided. This varistor stack 60 is connected across the composite primary winding 12 between its terminations 32 and 34. Additional surge protection is provided by means of a separate varistor element 62t connected across the winding section 102. When the transformer is in its low voltage configuration of FIG. 5, the separate varistor element 62t is connected across the parallel combination of the three winding sections 102, 114 and 116.

When the transformer is in its low voltage configuration of FIG. 5, surge voltages across the parallel combination of the three windings 102, 114 and 116 are clamped by varistor element 62t at about 3 KV, and surge voltages across the entire primary winding 12 are clamped by varistor stack 60 at about 27 KV. This provides adequate surge protection for all the then-active winding sections 102, 114 and 116 as well as for the then-idle winding section 120.

As with embodiment of FIGS. 1 and 2, it is to be noted that the above-described surge protection provided for the winding sections of the transformer of FIGS. 4 and 5 has been introduced without adding complexity of bulk to the dual voltage switch (136) or to the wiring that connects the switch to the winding sections.

In most prior dual voltage transformers, surge protection was provided simply by connecting an external arrester across the transformer, and this arrester had the same break-over voltage whether the transformer was connected for its higher voltage or its lower voltage rating. In such transformers, it was necessary to provide the primary winding sections with extra insulation to protect them, when connected in their lower-voltage configuration, against lightning-induced surges beneath the breakover voltage of the external arrester. We avoid the need for this extra insulation because our surge arrester arrangement is able, when the transformer is in its lower voltage rating configuration, to limit the surge voltages appearing across the winding sections to lower voltage levels consistent with the dielectric strength of normal insulation on the winding sections. In other words, the levels of voltage surge protection are closely tailored to the voltage ratings of the transformer, thus permitting reductions in the insulation levels to which the transformer must be designed.

In the embodiments illustrated in FIGS. 1-5, the transformer primary winding 12 is connected between line voltage and ground. Our invention in its broader aspects comprehends a transformer that has its primary winding connected between line voltage and a reference potential other than ground, e.g., connected between the phases of a polyphase a.c. system. Such a transformer is illustrated in FIG. 6, where the outgoing lead 28, instead of being connected to the grounded transformer tank 24, exits the transformer tank through an insulating bushing 126 that insulates lead 28 from the tank and ground.

Figure 6:
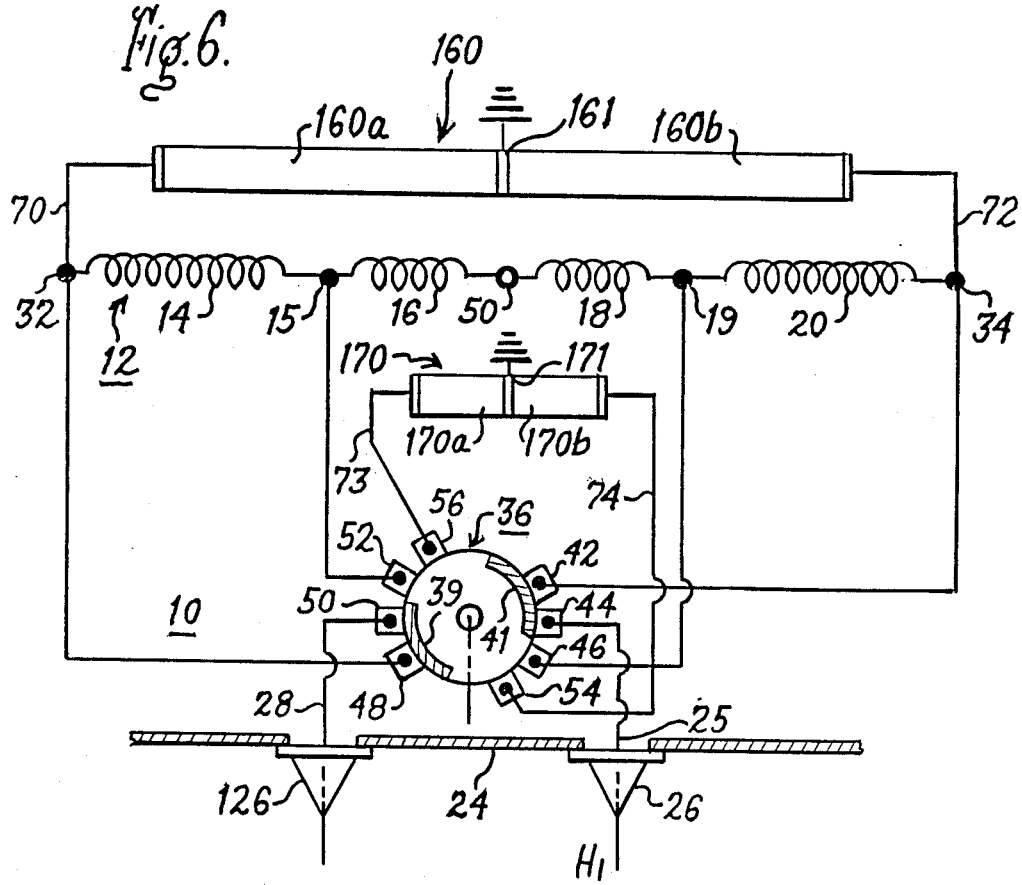
FIG. 6 is a circuit diagram of a dual voltage transformer having a primary winding connected for its higher voltage rating between two phase-conductors and surge-protected in accordance with a modified form of the invention.

The primary winding 12 of FIG. 6, like that of FIG. 1, is divided into four series-connected sections 14, 16, 18 and 20 having voltage ratings corresponding to their counterparts in FIG. 1. Connected across the entire winding 12 comprising series-connected sections 14, 16, 18 and 20 is a stack 160 of varistor elements having its midpoint 161 connected to ground. Connected across the winding portion comprising series-connected sections 16 and 18, but only when the transformer is in its lower voltage configuration, is a second stack 170 of varistor elements having its midpoint 171 connected to ground. The varistor elements of FIG. 6 are all located with the transformer tank 24.

Figure 7:
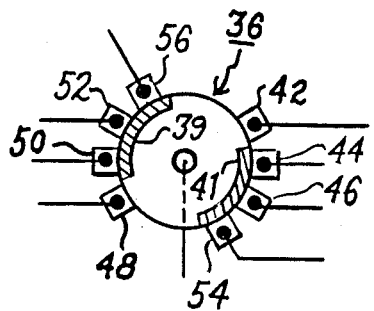
FIG. 7 shows the dual voltage switch present in the embodiment of FIG. 6 operated into its position where it connects the transformer for its lower voltage rating.

The dual voltage switch 36 of FIGS. 6 and 7 is essentially the same as the correspondingly designated switch of FIG. 1, except that the switch 36 of FIGS. 6 and 7 includes two additional contacts 54 and 56 which serve to disconnect the varistor stack 170 from winding 12 when the switch 36 is in its higher voltage position of FIG. 6 but to connect the stack across winding sections 16 and 18 when the switch 36 is in its lower voltage position in FIG. 7. Compared to the switch of FIG. 1, the conductive segments 39 and 41 of the switch 36 of FIGS. 6 and 7 are slightly lengthened to make such switching possible.

The presence of the ground connection 161 in the varistor stack 160 results in half the stack 160 (i.e., the half 160a) being connected between termination 32 and ground and the other half 160b being connected between termination 34 and ground. Each of these halves preferably has the same voltage rating as the stack 60 of FIG. 1.

The presence of the ground connection 171 in the varistor stack 170 results in (i) half the stack 170 (i.e., the half 170a) being connected between tap 15 and ground when the transformer is connected for its lower voltage rating and (ii) the other half 170b being connected between tap 19 and ground during this same interval. Each of these halves preferably has the same rating as the varistor 62s of FIG. 3.

The varistors of FIG. 6, being connected across the terminals of preselected winding portions, are able to protect the winding portions from excess voltages developed between these terminals. Each of the halves 160a and 160b of the varistor stack 160, being connected between one of the winding terminations and ground, is also able to protect against a termination-to-ground voltage at the associated termination that might otherwise damage the adjacent winding section. This overvoltage-protection capability is present whether the transformer is connected for its higher voltage rating of FIG. 6 of for its lower voltage rating of FIG. 7.

While we have shown and described particular embodiments of our invention, it will be obvious to those skilled in the art that various changes and modifications may be made without departing from our invention in its broader aspects; and we, therefore, intend in the appended claims to cover all such changes and modifications as fall without the true spirit and scope of our invention.

We claim:

1. A dual voltage distribution transformer comprising, in combination:
   (a) a transformer tank,
   (b) a primary winding disposed within said tank and having:
   (i) a first termination for connection to line voltage when the transformer is to be operated at a relatively high voltage applied between said first termination and ground and (ii) a second termination for connection to the ground,
   (c) a tap at a location intermediate the length of said winding for connection to line voltage when the transformer is to be operated at a relatively low voltage, applied between said tap and ground,
   (d) a dual voltage switch operable in a first condition to connect said first termination to line voltage while said tap is idle and operable in a second condition to connect said tap to line voltage and to disconnect said first termination from line voltage except through a then-idle portion of said primary winding extending between said tap and said first termination,
   (e) first varistor means disposed within said tank and having opposed first and second electrode ends,
   (f) means for electrically connecting said first electrode end to said first winding termination and for electrically connecting said second electrode end to said second winding termination,
   (g) second varistor means disposed within said tank, having a lower breakover voltage than said first varistor means, and having opposed electrode ends, and
   (h) connection means operable when said tap is connected to line voltage for electrically connecting one of the electrode ends of said second varistor means to said tap and the other electrode end of said second varistor means to ground.

2. The dual voltage transformer of claim 1 in which said first varistor means comprises a stack of varistor elements, and said second varistor means comprises at least one but less than all of the varistor elements in said stack.

3. The dual voltage transformer of claim 1 in which said first varistor means comprises a stack of varistor elements, and said second varistor means comprises at least one varistor element separate from said stack.

4. The dual voltage transformer of claim 1 in which:
   (a) said tap of claim 1 is a first tap,
   (b) there is a second tap at a location spaced along the length of said primary winding from said first tap, and the portion of said primary winding between said tap serves as the active portion of said primary winding when the transformer is operated at said relatively low voltage,
   (c) said dual voltage switch is operable in said first condition also to connect said second termination to ground and is operable in said second condition to connect said second tap to ground and to disconnect said second termination from ground except through a then-idle second portion of said primary winding extending between said second tap and said second termination, and
   (d) said second varistor means is connected between said first and second taps.

5. The dual voltage transformer of claim 4 in which the ratio between said relatively high voltage and said relatively low voltage is at least as high as 4 to 1.

6. The dual voltage transformer of claim 1 in which:
   (a) the portion of said primary winding between said tap and ground comprises a plurality of winding sections that are connected in series when the transformer is to be operated at said relatively high voltage, and
   (b) said dual voltage switch connects said winding sections in parallel when in said second condition.

7. The dual voltage transformer of claim 6 in which:
(a) the parallel combination of said winding sections has a pair of terminals, and
(b) said second varistor means is connected across the terminals of said parallel combination of winding sections when said winding sections are connected in parallel.

8. The dual voltage transformer of claim 6 in which the ratio between said relatively high voltage and said relatively low voltage is at least as high as 4 to 1.

9. The dual voltage transformer of claim 1 in which the ratio between said relatively high voltage and said relatively low voltage is at least as high as 4 to 1.

10. A dual voltage distribution transformer comprising, in combination:
(a) a transformer tank,
(b) a primary winding disposed within said tank and having:
(i) a first termination for connection to line voltage when the transformer is to be operated at a relatively high voltage applied between said first termination and a reference potential and (ii) a second termination for connection to said reference potential,
(c) a tap at a location intermediate the length of said winding for connection to line voltage when the transformer is to be operated at a relatively low voltage, applied between said tap and said reference potential,
(d) a dual voltage switch operable in a first condition to connect said first termination to line voltage while said tap is idle and operable in a second condition to connect said tap to line voltage and to disconnect said first termination from line voltage except through a then-idle portion of said primary winding extending between said tap and said first termination,
(e) first varistor means disposed within said tank and having opposed first and second electrode ends,
(f) means for electrically connecting said first electrode end to said first winding termination and for electrically connecting said second electrode end to said second winding termination,
(g) second varistor means disposed within said tank, having a lower breakover voltage than said first varistor means, and having opposed electrode ends, and
(h) connection means operable when said tap is connected to line voltage for electrically connecting one of the electrode ends of said second varistor means to said tap and the other electrode end of said second varistor means to said reference potential.

11. The dual voltage distribution transformer of claim 10 in which:
(a) said first varistor means comprises two varistor portions, one of which is connected between said first termination and ground and the other of which is connected between said second termination and ground,
(b) said tank is normally at ground potential, and
(c) both of said winding terminations are electrically insulated from ground.

12. The dual voltage distribution transformer of claim 11 in which:
(a) said line voltage is the voltage of one phase of a poly-phase a.c. system, and
(b) said reference potential is the voltage of a second phase of said a.c. system.

13. The dual voltage distribution transformer of claim 11 in which said second varistor means comprises two varistor portions, one of which is connected between said tap and ground when said tap is connected to line voltage and the other of which is connected between said reference potential and ground when said tap is connected to line voltage.

14. The dual voltage distribution transformer of claim 11 in which:
(a) said second varistor means comprises two varistor portions, and
(b) said connection means includes: (i) first means for connecting one of said varistor portions of said second varistor means between said tap and ground when the tap is connected to line voltage and (ii) second means for connecting the other of said varistor portions of said second varistor means between said reference potential and ground when said tap is connected to line voltage.

* * * * *